Patented Dec. 15, 1931

1,837,130

UNITED STATES PATENT OFFICE

CLAIR A. MYERS, OF DALLAS, TEXAS, ASSIGNOR TO THE KONTOL COMPANY, OF DALLAS, TEXAS, A CORPORATION OF TEXAS

TREATMENT OF OIL AND WATER EMULSIONS

No Drawing. Application filed October 17, 1929. Serial No. 400,445.

The invention relates to a treatment of the oil and water emulsions undesirable incidental to petroleum production.

This application is a continuation-in-part of my application Serial No. 139,017, filed October 1, 1926.

The object of this treatment is to remove the characteristic of permanence from the emulsions and/or to accelerate the coalescence of the components.

I treat these emulsions with a specific class of reagents so potent that they induce the desired result when introduced into the emulsions in relatively small quantities.

The primary emulsion breaking reagents, of this invention are the mineral oil sulfonic bodies recovered as by-products from the processes of refining petrolic fractions or distillates, with strong or fuming sulfuric acid and/or sulfur trioxide to produce medicinal white oils or light colored technical oils. The more effective of these sulfuric bodies for breaking emulsions are the more water soluble sulfonates usually recovered from the sludge layer. However, a substantial percentage of the oil soluble sulfonates from the oil layer may be used in conjunction with the sludge layer bodies without destroying their water soluble characteristics.

Now most emulsions are of the water in oil type. It is therefore desirable to accomplish the distribution of the sulfonic body throughout the oil phase rapidly in order to avoid local concentrations of the sulfonic bodies which might reverse the phases of the emulsion. I have found that this rapid distribution and its attendant advantages can be accomplished by admixing the mineral oil sulfonic bodies with oil soluble bodies such as modified fatty acids and/or organic soap making materials. These bodies moreover tend to alter the surface tension of the oil and in conjunction with the sulfonates destroy the balance of the emulsion.

The modified fatty acids before mentioned are the esters and sulfonates of fatty acids, the sulfo-aromatic compounds of fatty acids, the salts and esters of such substances and mixtures of two or more of the substances above mentioned.

The soap making materials before mentioned include oleic acid, rosin and the other fatty or organic substances of said industry.

The reagent of the nature described is incorporated in the emulsions in the proportion of one part reagent to one thousand parts emulsions by volume. The emulsion is then heated to and maintained at a temperature between 150° and 200° F. until coalescence has proceeded to an extent sufficient to permit stratification into an oil layer and a water layer. This separation can be produced by gravity settling, filtration, centrifugal force or other mechanical means.

Emulsion characteristics vary infinitely according to proportions of oil and water, percentage and specie of salt in water solution, and presence or nature of emulsifying agent. No adequate comprehensive emulsion classifications have been made or can be made as a result of research to date. But I have verified the utility of the herein disclosed treatment of emulsions generally and have noted the particular effectiveness of the reagent on emulsions relatively insensitive to other known reagents. Moreover the combination of mineral oil sulfonates and modified fatty acids mixed into a homogeneous reagent produces results superior to those produced by either component alone or by introducing them separately into the emulsion.

Tests verifying the utility of the above-disclosed process and reagent were conducted as follows:

A crude emulsion from Odessa, Texas was treated first with a salt of a sulfo fatty aromatic acid. Not until the end of thirty minutes was the oil entirely clean and all of the water precipitated. A sample of the same emulsion was then treated with a soap of a mineral oil sulfonic acid. Again about thirty minutes was required before all of the water was precipitated, though the action seemed more rapid than the treatment with the first mentioned body. A sample of the same emulsion was then treated successively with the two bodies above mentioned, that is, first one was put in and then the other. Again the complete break required approximately thirty minutes. Another test was made in which a sample from the same emulsion was treated with a body comprising a homogeneous admixture of the salt of the sulfo fatty aromatic acid and the salt of the mineral oil sulfonic acid. The emulsion was completely broken and all of the water precipitated in five minutes.

It is impossible to predict that all emulsions will respond to this same degree since emulsions vary infinitely in their characteristics, but the above is offered as a sample of the effectiveness of the reagent of this invention.

Having described my invention, I desire to be limited only by the ensuing claims:

1. A process for breaking petroleum and water emulsions, said process, comprising, adding to said emulsions a homogeneous admixture of water soluble mineral oil sufonic bodies and modified fatty acids.

2. A process for breaking petroleum and water emulsions, said process, comprising, adding to said emulsions a homogeneous admixture of water soluble mineral oil sulfonic bodies, and products resulting from the sulfonation of fatty acids.

3. A process for breaking petroleum and water emulsions, said process, comprising, adding to said emulsions a homogeneous admixture of water soluble mineral oil sulfonic bodies and sulfo fatty aromatic acid products.

In witness whereof, I hereunto subscribe my name.

CLAIR A. MYERS.